Patented May 24, 1949

2,471,093

UNITED STATES PATENT OFFICE 2,471,093

3,3'-THENOIN

Ernest E. Campaigne and William M. Le Suer, Bloomington, Ind., assignors to Indiana University Foundation, Monroe County, Ind., a corporation of Indiana No Drawing. Application November 28, 1947, Serial No. 788,666

1 Claim. (Cl. 260—329)

The present invention relates to a novel organic compound, 3,3'-thenoin, otherwise designated according to conventional nomenclature as 1-hydroxy-2-keto-1,2-di(3-thienyl)ethane. The new compound is a valuable intermediate in the preparation of more complex organic molecules, such as di-(3-thienyl)-glyoxylic acid.

The novel compound of the present invention is a white crystalline solid, which has a melting point of 116–117 degrees centigrade. It may be conveniently prepared by heating 3-thenaldehyde in alcohol containing a small quantity of an alkali metal cyanide, e. g., sodium or potassium cyanide. The 3-thenaldehyde, which is employed as starting material, is known in the art and may be prepared according to the procedure of Steinkopf and Schmitt, Ann., 533, 264 (1938), from 3-iodothiophene. This compound may more advantageously be prepared from 3-thenyl bromide by conversion to the quaternary hexamethylenetetramine salt and subsequent steam-distillation of a solution of the amine salt to give a high yield of the 3-thenaldehyde, as is more fully described in our co-pending application, Serial 788,665, filed November 28, 1947.

The following example is given to illustrate the practice of the present invention, but is in no way to be construed as limiting.

A solution of fifty milliliters of ethanol containing two grams of sodium cyanide and three grams of 3-thenaldehyde was heated to reflux for one hour. The mixture of reaction products was then poured into 150 milliliters of water, the mixture thoroughly shaken, and cooled over night. The product was recrystallized from water, yielding one gram (33 per cent of theory) of slender white needles having a melting point of 116–117 degrees centigrade.

Anal.—Calcd. for $C_{10}H_8O_2S$: S, 28.59
Found: S, 28.59

Instead of the ethanol employed in the preceding example, other lower-aliphatic alcohols, e. g., methanol, propanol, isopropanol, n-butanol and the like, may be used as the reaction medium.

Various modifications may be made in the procedure employed for the preparation of the desired compound, and it is to be understood that we limit ourselves only as defined in the appended claim.

We claim:

As a new compound, 3,3'-thenoin, having the formula

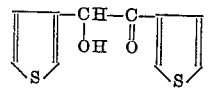

ERNEST E. CAMPAIGNE.
WILLIAM M. LE SUER.

REFERENCES CITED

The following references are of record in the file of this patent:

Karrer: "Organic Chemistry," page 463, Nordeman, N. Y., 1938.

Richter: "Organic Chemistry," pages 649, 650, Wiley, N. Y., 1938.